United States Patent [19]

Farfaletti-Casali et al.

[11] 4,362,207
[45] Dec. 7, 1982

[54] INTEGRATED HEAT EXCHANGE AND HEAT STORAGE SYSTEM USING LOW-TEMPERATURE REACTIONS

[75] Inventors: Flaviano Farfaletti-Casali, Brebbia; Umberto Buzzi, Angera; Leendert Nobel, Laveno Mombello; Friedrich Reiter, Ispra, all of Italy

[73] Assignee: European Atomic Energy Community (Euratom), Luxembourg

[21] Appl. No.: 168,067

[22] Filed: Jul. 14, 1980

[30] Foreign Application Priority Data

Jul. 12, 1979 [IT] Italy .............................. 49736 A/79

[51] Int. Cl.$^3$ .............................................. F28D 21/00
[52] U.S. Cl. .................................. 165/10; 165/104.12; 165/104.19; 126/436
[58] Field of Search ...................... 165/104.12, 104.17, 165/104.11 A, 10 A, 104.19, 104.11 R; 126/436, 435

[56] References Cited

U.S. PATENT DOCUMENTS

| | | | |
|---|---|---|---|
| 4,131,158 | 12/1978 | Abhat et al. ..................... | 126/436 X |
| 4,135,371 | 1/1979 | Kesselring et al. ........ | 165/104.12 X |
| 4,146,057 | 3/1979 | Friedman et al. .............. | 126/436 X |
| 4,166,449 | 9/1979 | Depew ............................ | 126/436 X |
| 4,270,523 | 6/1981 | van Heel ......................... | 126/436 X |

FOREIGN PATENT DOCUMENTS

| | | |
|---|---|---|
| 2552698 | 6/1977 | Fed. Rep. of Germany . |
| 2741829 | 3/1979 | Fed. Rep. of Germany . |
| 2365093 | 10/1979 | France . |
| 847984 | 9/1960 | United Kingdom . |

Primary Examiner—Albert W. Davis, Jr.
Attorney, Agent, or Firm—Stevens, Davis, Miller & Mosher

[57] ABSTRACT

An integrated heat exchange and heat storage system using thermochemical reactions which comprises a first plurality of parallel adjacent tubes containing an element for storing and yielding heat; and a second plurality of tubes parallel to said first plurality of tubes and interposed therebetween and containing a fluid heat vehicle, the first and second plurality of tubes being disposed in a receptacle whose major axis extends parallel to the axis of the tubes, the voids between the various tubes being filled with a stagnant liquid serving to facilitate heat exchange between the fluid heat vehicle and the element for storing and yielding heat.

5 Claims, 3 Drawing Figures

INTEGRATED HEAT EXCHANGE AND HEAT STORAGE SYSTEM USING LOW-TEMPERATURE REACTIONS

This invention relates to an integrated system adapted to use and exploit substances in solid and paste form which are capable of exo-endothermic thermochemical reactions at temperatures below 100° C., more particularly in the range between 20° and 60° C., as a means for term storage of thermal energy.

By way of example consideration will be given to the reaction with change of phase forming the subject matter of British patent application Ser. No. 16472/78 entitled "Storage of Thermal Energy".

That patent application is based on the use of the following reaction in a slight excess of water: $NaSO_4.10 H_2O + MgSO_4.7 H_2O + (nH_2O) \rightarrow$ absorbing heat $Na_2Mg(SO_4)_2.4H_2O + 13 H_2O + (nH_2O) \leftarrow$ yielding heat The first reaction occurs to the right at a temperature above approximately 22° C. with a storage capacity of approximately 80 kcal/liter. The heat absorbed is yielded in the subsequent dissociation down to temperatures below 22° C. The system is in the form of a partially crystallized pasty substance with a slight excess of water, when it is shifted to the left after yielding the absorbed energy, and as a very fine suspension in an aqueous solution when it is shifted to the right after absorbing heat. The average density of the system is 1.6.

Another system suitable for this invention uses reciprocal salt pairs such as:

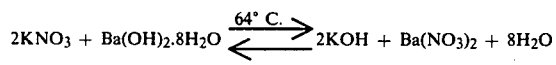

$$2KNO_3 + Ba(OH)_2.8H_2O \underset{\longleftarrow}{\overset{64° C.}{\longrightarrow}} 2KOH + Ba(NO_3)_2 + 8H_2O$$

whose transformation temperature is 64° C.—i.e., the system can store heat above 64° C. and yield it below 64° C.

According to the main feature of the invention, the integrated heat exchange and heat storage system using thermochemical reactions comprises: a first plurality of parallel adjacent tubes containing the heat exchanger element for storing and yielding the heat; and a second plurality of tubes parallel to the first-mentioned tubes and interposed therebetween and containing the fluid heat vehicle, this system of tubes or ducts being disposed in a receptacle whose major axis extends parallel to the axis of the tubes, the voids between the various ducts being filled with a stagnant liquid serving to facilitate heat exchange between the fluid heat vehicle and the element for storing and yielding heat.

According to another feature of the invention, the heat exchanger element is an exo-endothermic mixture.

According to another feature of the invention, the fluid heat vehicle is water.

The reactions and ingredients mentioned are exploited in the solid or pasty state, the viscosity depending on how much water is in excess and therefore upon the temperature for filling the e.g. cylindrical and preferably plastics, e.g. polypropylene, tubes. Volume variations are absorbed by slight deformations of the plastics tubes which are closed at their ends and which have a diameter of approximately from 10 to 20 mm. A tube bunch forming a storage volume or mass is produced by combining a number of such tubes with their axes parallel to one another.

Two embodiments of the integrated system in accordance with this invention are shown in the accompanying drawings wherein.

Figure 1:
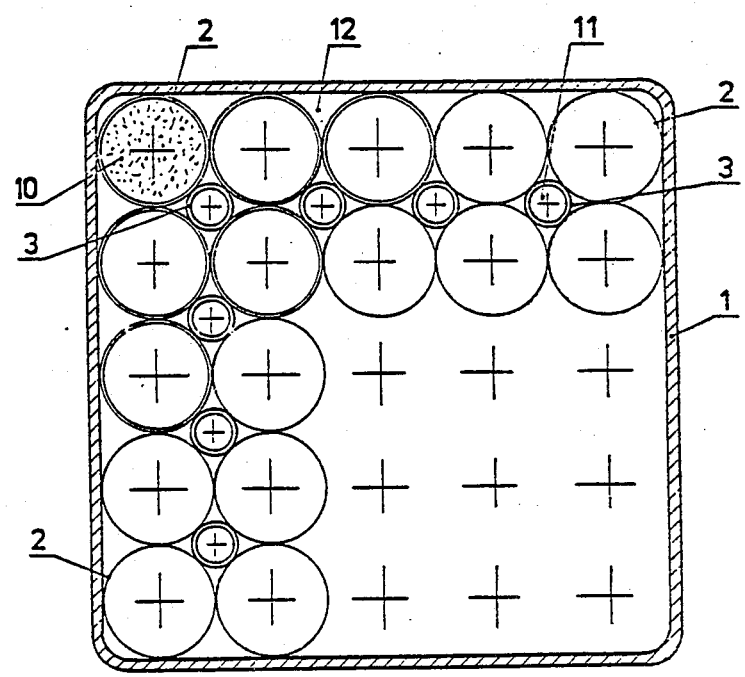
FIG. 1 is a view in cross-section of a storage unit or module consisting of a bunch of tubes in a square box.

Referring to FIG. 1, there can be seen a receptacle 1 for a first plurality of tubes 2 which are made of plastics, such as polypropylene or polyethylene, the container or the like 1 being 2 mm thick. The plurality consists of 25 tubes made of the same material as the receptacle 1. Each tube 2 has an outside diameter of 19 mm, is 1.6 mm thick and contains a fluid or pasty storage substance 10. Disposed in the gaps between the tubes 2 coaxially thereof are tubes 3 which are also made of plastics, have an outside diameter of 8 mm, are 1 mm thick and are flowed through by the fluid heat vehicle, as a rule water 11. The same serves to supply heat during the supply phase and to recover the stored heat during the recovery phase. Heat exchange between the fluid flowing through the tubes 3 and the storage agent in the tubes 2 is by conduction through the plastics walls of the tubes and through the solid or pasty substance which is disposed in the tubes and in which the thermochemical transformation of storage and yielding of heat occurs gradually in one direction or the other. Stagnant water is provided in gaps 12 between the tubes 2 and 3 to facilitate heat exchange between the two kinds of tube.

The water piping 3 can be connected in parallel between the two ends of the receptacle 1 or can be subdivided into two halves connected in series and each consisting of parallel-connected tubes. Consequently, and as shown in FIG. 2, the heat vehicle can flow through the receptacle 1 in both directions, and so the input tube 4 and discharge tube 5 would be arranged at the same ends of the system.

Figure 2:
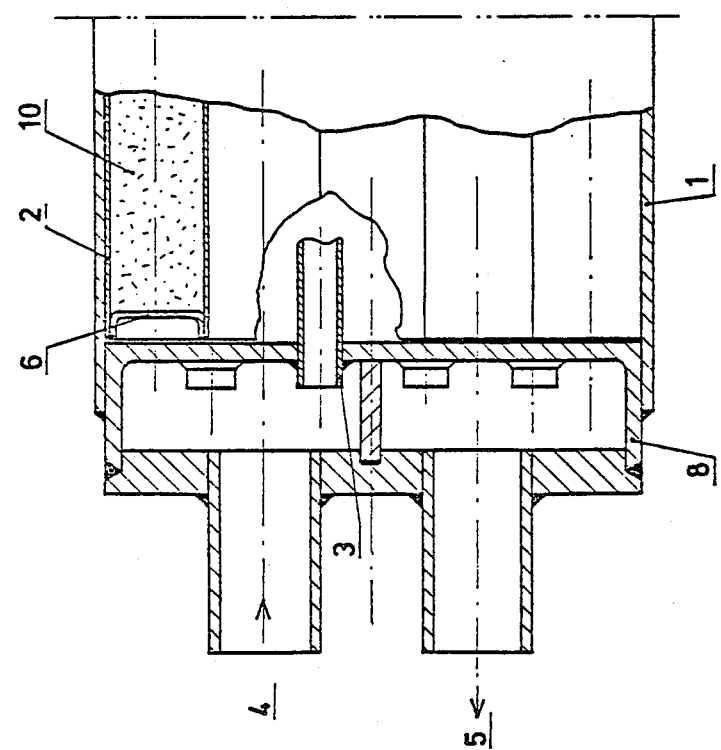
FIG. 2 is a view in longitudinal section of the ends of the tube bunch and associated box.

The element shown by way of example in FIGS. 1 and 2 measure 10×10 cm, is 2 m long, and has a capacity of 20 liters of which 11.5 liters consist of the actual volume available for the storage agent, 3.5 liters are stagnant water and 1.25 liter are circulating water.

As shown in FIG. 2, all the tubes 2 are closed at both ends 6, 7 which are secured in the receptacle 1 by means of two end plates 8, 9.

Figure 3:
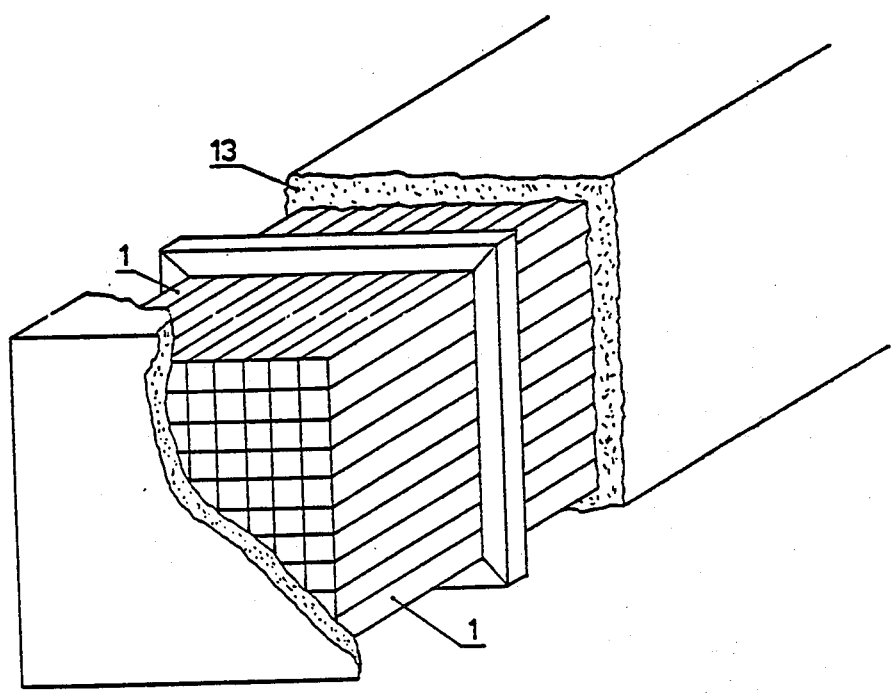
FIG. 3 is a perspective view of how various storage modules or units can be combined one beside another and thermally insulated all the way round to provide considerable storage in a small volume.

If 100 elements are combined as shown in FIG. 3, a heat storage and exchange volume of a total of some 2 m³ is provided containing 1.15 m³ of a mixture of salts suitable for providing heat storage by means of a thermochemical reaction.

The volume obtained by combining individual units or modules can readily be thermally insulated by placing a layer or wrapping of heat insulant 13, such as glass wool or expanded polystyrene, around the outside.

The fluid supplying the heat energy, such as hot water from solar collectors (operating in the daytime or summer) or the fluid for recovering the stored heat, such as water for heating system of a house (during the night or in the winter) can flow in various ways in series or parallel between the various modules in dependence upon the form of connection used between the supply and discharge tubes and the end plates.

The invention described is not limited to the embodiment disclosed and the proposed system is suitable for various geometric layouts differing from those described and for the use of constructional materials and heat storage means of various kinds, including solid means and without change of phase.

What is claimed is:

1. An integrated heat exchange and heat storage system using thermochemical reactions, characterized in that it comprises: a first plurality of parallel adjacent tubes containing an element for storing and yielding heat; and a second plurality of tubes parallel to said first plurality of tubes and interposed therebetween and containing a fluid heat vehicle, said first and second plurality of tubes being disposed in a receptacle whose major axis extends parallel to the axis of the tubes, the voids between the various tubes being filled with a stagnant liquid serving to facilitate heat exchange between the fluid heat vehicle and the element for storing and yielding heat.

2. A system according to claim 1, characterised in that the heat exchanger element is an exo-endothermic mixture.

3. A system according to claim 1, characterised in that the fluid heat vehicle is water.

4. A system according to claim 1, characterised in that the stagnant liquid is water.

5. A system according to claim 1, characterised in that the various tubes and the receptacle are made of plastics.

* * * * *